(12) United States Patent
Reuter et al.

(10) Patent No.: US 11,421,600 B1
(45) Date of Patent: Aug. 23, 2022

(54) FUEL SUPPLY SYSTEM WITH COMBINED METERING AND SHUTOFF VALVE

(71) Applicant: Hamilton Sundstrand Corporation, Charlotte, NC (US)

(72) Inventors: Charles E. Reuter, Granby, CT (US); Todd Haugsjaahabink, Springfield, MA (US); Aaron F. Rickis, Longmeadow, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/213,685

(22) Filed: Mar. 26, 2021

(51) Int. Cl.
*F02C 7/232* (2006.01)
*F02C 9/26* (2006.01)
*F02C 7/22* (2006.01)

(52) U.S. Cl.
CPC .............. *F02C 7/232* (2013.01); *F02C 7/222* (2013.01); *F02C 9/263* (2013.01); *F05D 2240/55* (2013.01); *F05D 2260/60* (2013.01); *F05D 2270/301* (2013.01); *F05D 2270/56* (2013.01)

(58) Field of Classification Search
CPC .......... F02C 7/232; F02C 7/222; F02C 9/263; F05D 2240/55; F05D 2260/60; F05D 2270/301; F05D 2270/56
See application file for complete search history.

(56) References Cited

U.S. PATENT DOCUMENTS

| | | | |
|---|---|---|---|
| 2,485,349 A | 10/1949 | Barr | |
| 2,510,617 A | 6/1950 | Barr | |
| 5,118,075 A | 6/1992 | Portolese | |
| 6,250,894 B1* | 6/2001 | Dyer | F04D 13/14 417/279 |
| 6,619,027 B1* | 9/2003 | Busch | F02C 9/38 60/39.281 |
| 7,007,452 B1* | 3/2006 | Baryshnikov | F02C 7/232 60/734 |
| 7,131,274 B2 | 11/2006 | Baryshnikov et al. | |
| 7,273,068 B2 | 9/2007 | Ballenger et al. | |
| 8,104,258 B1 | 1/2012 | Jansen et al. | |
| 8,991,186 B2* | 3/2015 | Bickley | F02C 9/46 60/233 |

(Continued)

FOREIGN PATENT DOCUMENTS

| | | |
|---|---|---|
| GB | 630325 | 10/1949 |
| GB | 644324 | 10/1950 |

*Primary Examiner* — Jesse S Bogue

(74) *Attorney, Agent, or Firm* — Carlson, Gaskey & Olds, P.C.

(57) ABSTRACT

A metering valve spool controls a volume of fuel passing through a metering valve. The spool has a forward face. A line from a pump has a connection into a chamber. The face of the metering valve spool may contact a seal to block flow into the chamber. The metering valve is connected to a pressure regulating valve. The pressure regulating valve is to be connected to a combustor. A control selectively moves the metering valve spool to control a volume of fuel delivered from the chamber to the pressure regulating valve. The control is also programmed to move the metering valve spool to a position where a forward face of the metering valve spool seals on the seal to block flow from the pump from reaching the pressure regulating valve, and also from reaching the tap. A gas turbine engine is also disclosed.

20 Claims, 3 Drawing Sheets

(56) References Cited

U.S. PATENT DOCUMENTS

| | | | |
|---|---|---|---|
| 2010/0037867 A1* | 2/2010 | Kleckler | F02C 7/236 |
| | | | 123/510 |
| 2018/0135529 A1* | 5/2018 | Portolese | F02C 9/263 |
| 2020/0131994 A1* | 4/2020 | Carpenter | G05D 16/10 |
| 2020/0378315 A1* | 12/2020 | Reuter | F02C 7/236 |

* cited by examiner

FUEL SUPPLY SYSTEM WITH COMBINED METERING AND SHUTOFF VALVE

BACKGROUND

This application relates to valving for use in a fuel supply system for a gas turbine engine.

Gas turbine engines are known, and typically include a fan delivering air into a compressor where it is compressed and delivered into a combustor. The compressed air is mixed with fuel in the combustor and ignited. Products of this combustion pass downstream over turbine rotors, driving them to rotate. The turbine rotors drive fan and compressor rotors.

As known, a fuel supply system for supplying fuel to the combustor must deliver an accurate volume of fuel, and at a desired pressure. Thus, it is known to have fuel supply systems including a fuel tank with a pump delivering fuel through a metering valve. The metering valve is controlled by an engine control to provide a desired volume of fuel to the combustor dependent on the needs of the engine.

Downstream of the metering valve the fuel passes through an in-line pressure regulating valve which maintains a desired fuel pressure drop across the metering valve window.

Downstream of the pressure regulating valve there is a shutoff valve which selectively shuts off the supply of fuel downstream of the pressure regulating valve, and before it reaches the combustor in the gas turbine engine.

SUMMARY

A fuel supply system includes a metering valve to be connected to a fuel pump. The metering valve includes a metering valve spool which is movable to control a volume of fuel passing through the metering valve. The metering valve has an extension chamber and a retraction chamber on opposed sides of a land on the spool. The extension and retraction chambers communicate with a servo valve to communicate a pressure fluid and a dump connection to one of the extension and retraction chambers to extend or retract the metering valve spool. A forward valve spool face is on an axially forward side of the metering valve spool. The line to connect the metering valve to the pump has a connection through a metering valve housing which extends into a metering valve inlet chamber, providing a force against the forward face of the metering valve spool. A seal is provided such that the forward face of the metering valve spool may seal against the seal in the metering valve housing to block flow into the metering valve inlet chamber. A line extends through the valve spool housing from the chamber to a pressure regulating valve. The pressure regulating valve is downstream of the metering valve and has a pressure regulative valve spool having opposed faces. One of the opposed faces sees a pressure downstream of the metering valve, and an opposed valve face of the pressure regulating valve spool sees a pressure from a tap from the metering valve inlet chamber. A line downstream of the pressure regulating valve is to be connected to a combustor. A control controls a position of the metering valve spool, and selectively moves the metering valve spool to control a volume of fuel delivered from the chamber to the pressure regulating valve. The control is programmed to selectively move the metering valve spool to a position where the forward face of the metering valve spool seals on the seal in the metering valve housing to block flow from the centrifugal pump from reaching the pressure regulating valve, and also from reaching the tap.

These and other features may be best understood from the following drawings and specification, the following is a brief description.

DETAILED DESCRIPTION

Figure 1:
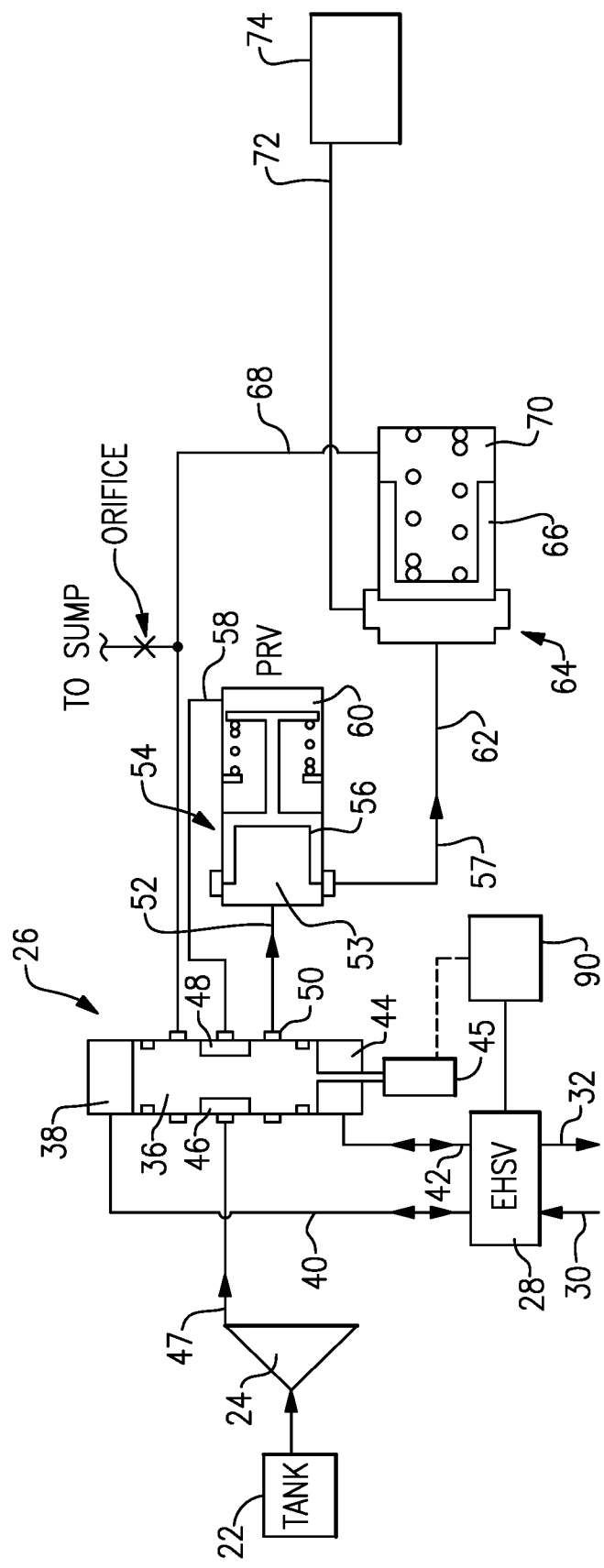
FIG. 1 shows a known fuel supply system.

Prior art fuel supply system 20 as illustrated in FIG. 1 includes a fuel tank 22 delivering fuel to a centrifugal pump 24. The pump 24 supplies fuel to a metering valve 26. Metering valve 26 has a spool 36 with its position controlled by an electrohydraulic servo valve 28. Valve 28 selectively supplies a high pressure fluid 30 and a low pressure fluid 32 to opposed sides of the spool 36. The low pressure fluid 32 is connected to a sump, and the high pressure fluid 30 is connected to a pump such as a hydraulic pump.

A line 40 communicates one of the lines 30 and 32 to a chamber 38 on one side of the spool 36, and the other line 42 to the opposed side 44 of the spool 36. A position transducer 45 communicates a position of the spool 36 to a control 90.

The control 90 may be a full authority digital electronic controller for an associated gas turbine engine, and is programmed to control the valve 28 to achieve a desired fuel flow dependent on the needs of the engine. Alternatively, a stand alone control may be used.

A chamber 48 is formed in an outer peripheral surface of the spool 36 and selectively communicates a line 47 downstream of the pump 24 to a chamber 50, and a line 52 heading to a pressure regulating valve 54. The line 52 passes into a chamber 53 in a housing, and then into a line 57 heading downstream of the pressure regulating valve 54. A spool 56 in pressure regulating valve 54 receives a tap 58 from chamber 48 of the metering valve spool 36 which is equal to the pressure downstream of the pump 24.

Thus, the pressure regulating spool 56 is moved to selectively achieve a desired pressure difference between the pressure on line 52 downstream of the metering valve 26 and the pressure on line 58 upstream of the spool valve 26.

Downstream of the spool 54 the fuel reaches a line 57 and heads to a shutoff valve 64. Shutoff valve 64 has a spool 66 biased by a spring 70, and the pressure 68 which is at a low pressure relative to the pressure on line 62.

When the metering valve closes (moves upwardly in the FIG. 1 position) chamber 48 provides two functions. First, it closes off a connection to chamber 50, which reduces the flow sent to the pressure regulating valve. It also connects to line 68 which closes the shutoff valve to prevent leakage from the metering valve and pressure regulating valve from reaching the combustor. If the shutoff valve 66 does not block flow downstream, flow will pass into a line 72 heading to a combustor 74 of a gas turbine engine.

Figure 2:
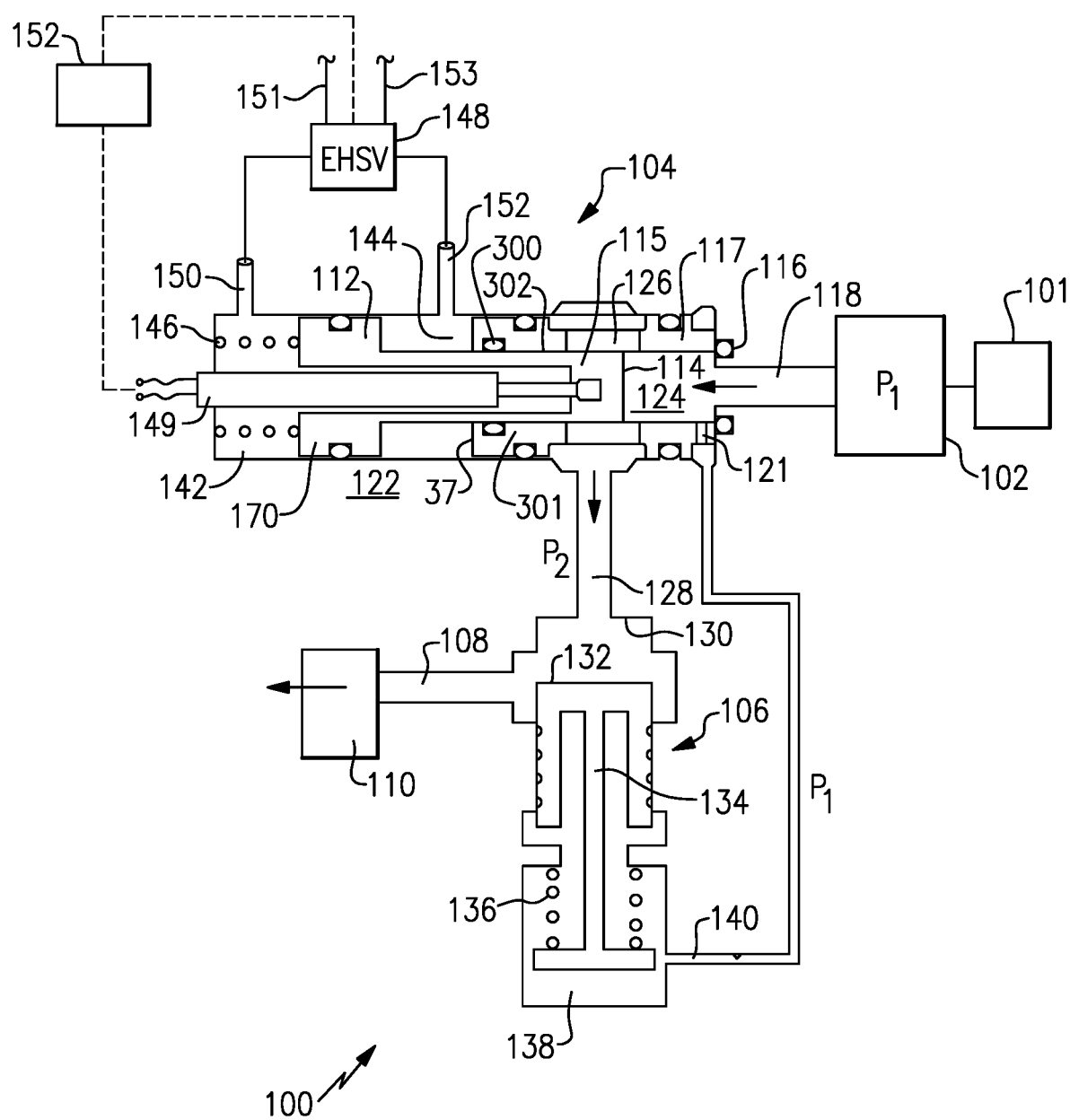
FIG. 2 shows a fuel supply system for a gas turbine engine in a first metering position.

A disclosed fuel supply system 100 is illustrated in FIG. 2. A fuel tank 101 delivers fuel to a centrifugal pump 102. The fuel reaches a metering valve 104, which controls the volume of fluid delivered downstream to a pressure regulating valve 106. Pressure regulating valve 106 achieves a desired pressure at a line 108 leading to combustor 110 for a gas turbine engine, similar to the Prior Art valve 54. The metering valve 104 under this disclosure also provides the function of a shut off valve, as will be explained.

A spool 112 is movable within a housing 122 in the metering valve 104. The spool 112 has a piston head 115 with a forward face 114 that may seal against a seal 116 in the housing 122.

A line 118 downstream of the pump 102 communicates fuel into a metering valve inlet chamber 124 forward of the face 114, and then into a valve chamber 126 where it is delivered into a line 128 approaching the pressure regulating valve 106. There is a pressure drop across the metering valve 104 between line 118 and line 128. In the pressure regulating valve 106 there is a surface 130 in a housing, which may be housing 122, or may be a distinct housing. A pressure regulating spool 134 has a forward face 132 that can approach the surface 130 dependent on a pressure difference between the lines 128 and a tap 121. Tap 121 provides a connection from metering valve inlet chamber 124 to a chamber 138 on an opposed side of the spool valve 134 from that seen by face 132. A spring 136 assists in biasing the spool 134 in a downward position, against the pressure from the line 140.

A control 152, which may be a full authority digital electronic controller ("FADEC") or may be a standalone controller is programmed to calculate a desired fuel flow to the combustor 110 based upon standard factors as is known in the art, and dependent on the operational conditions of the gas turbine engine associated with the combustor 110.

The control 152 controls an electrohydraulic servo valve 148, which is similar to that shown in FIG. 1, to selectively connect a high pressure line 151 and sump line 153 to a line 150 and 152 to an extension chamber 142 and a retraction chamber 144 on opposed sides of a land 170 on the spool 112.

A spring 146 acts in conjunction to the pressure in extension chamber 142 to bias the spool 112 to the right as shown in FIG. 2. A transducer 149 communicates a position of the spool 112 to the control 152.

Thus, during operation of the gas turbine engine associated with the combustor 110, the control 152 is programmed to move the spool 112 to a position to achieve a desired volume of fuel flow to the combustor 110 dependent on the operational conditions of the gas turbine engine.

Figure 3:
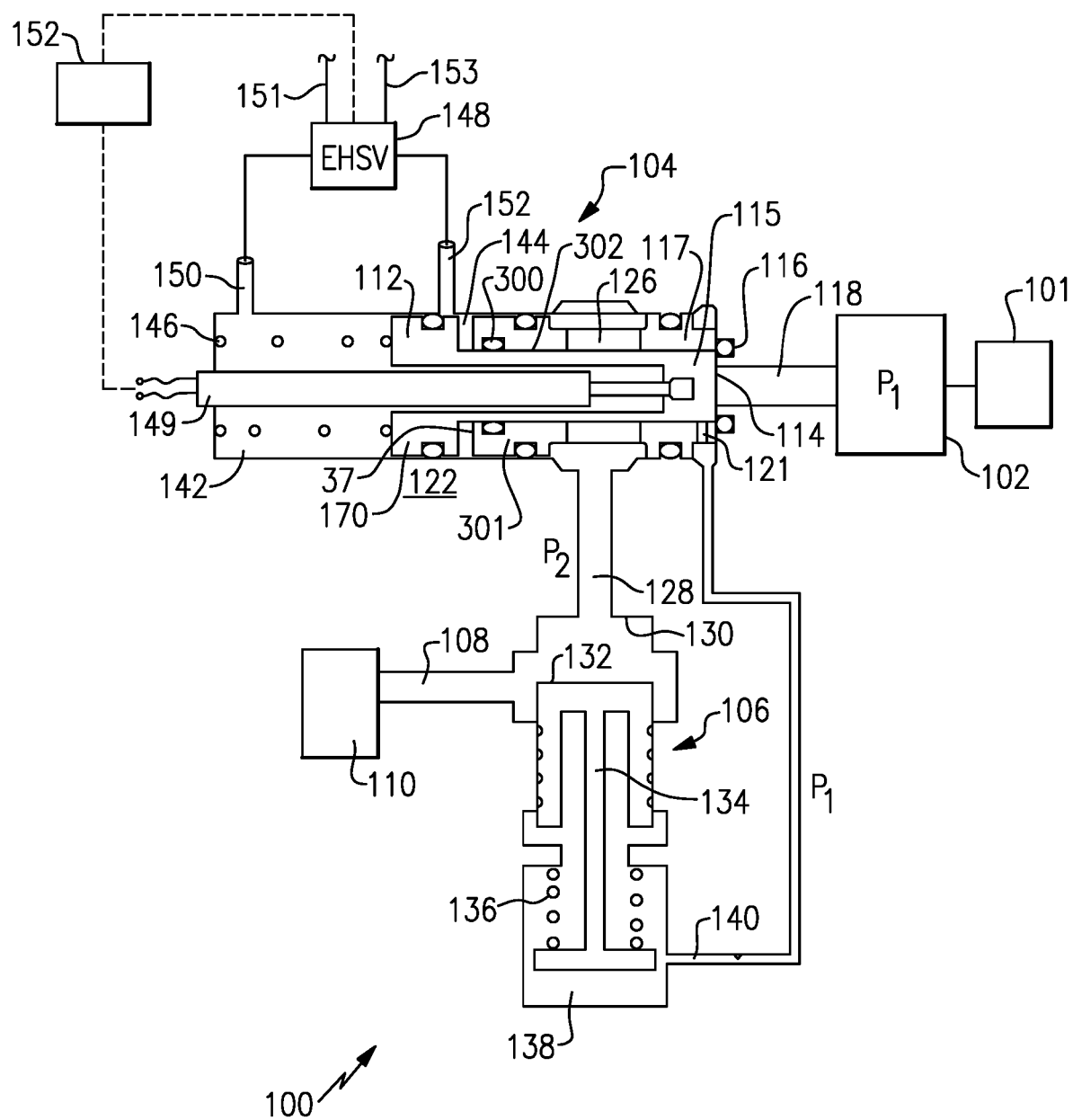
FIG. 3 shows the fuel supply system of FIG. 2 in a shutoff position.

If it is desirable to stop the flow to the combustor 110, then the control 152 is programmed to move the spool valve 112 to the position shown in FIG. 3. In the position shown in FIG. 3, face 114 seals on seal 116 to block flow downstream of the centrifugal pump 102 from reaching line 128, and also blocking flow of the fuel from reaching tap 121, and line 140.

The piston head 115 on the metering valve spool 112 has a first diameter and land 170 has a second diameter, larger than the first diameter.

The piston head 115 is received within a housing portion 117 extending to a forward end. The housing portion 117 guides the forward face 114 of the metering valve spool 112 to seat on the seal 116.

A housing portion 301 (which may be the same, or separate from housing portion 117) includes an o-ring seal 300 to seat on the metering valve spool outer peripheral surface 302. This provides a fluid tight seal between chambers 144 and 126. At shut down this assists in the complete shut off of flow downstream of metering valve 104.

As such, the system 100 illustrated in FIGS. 2 and 3 eliminates the requirement of the shutoff valve as has been utilized in the prior art as shown in FIG. 1.

A fuel supply valving system 100 under this disclosure could be said to include a metering valve 104 to be connected to a fuel pump 102, including a metering valve spool 112 which is movable to control a volume of fuel passing through the metering valve. The metering valve has an extension 142 and a retraction chamber 144 on opposed sides of land 170 on the metering valve spool. The extension and retraction chambers communicate with a servo valve 148 to communicate a pressure fluid and a dump connection to one of the extension and retraction chambers to extend or retract the metering valve spool.

The metering valve spool 112 has a valve spool face 114 on a forward side of the valve spool. A line 118 to connect the metering valve to the pump has a connection through a metering valve housing which extends into a metering valve inlet chamber 124 providing a force against the forward face of the valve spool. A seal 116 is provided such that the forward face of the metering valve spool may seal against the seal to block flow into the chamber. A line 128 extends through the metering valve housing from the chamber to a pressure regulating valve. The pressure regulating valve is downstream of the metering valve and has a pressure regulating spool 134 having opposed faces.

The pressure regulating spool 134 has a face that sees that a pressure downstream of the metering valve, and an opposed face of the pressure regulating spool sees a pressure from a tap 121 from the metering valve inlet chamber on an opposed side. A line downstream of the pressure regulating valve is to be connected to a combustor 110.

A control 152 is programmed to control a position of the metering valve spool. The control selectively moves the metering valve spool to control a volume of fuel delivered from the chamber 124 to the pressure regulating valve 106. The control is programmed to move the metering valve spool to a position where the forward face 114 of the valve spool seals on the seal 116 to block flow from the pump from reaching the line leading to the pressure regulating valve 106 and also from reaching the tap.

Although a specific embodiment has been disclosed, a worker of ordinary skill in this art would recognize that certain modifications could come within the scope of this disclosure. For these reasons, the following claims should be studied to determine the true scope and content of this disclosure.

What is claimed is:

1. A fuel supply system comprising:
 a metering valve connected to a fuel pump, the metering valve includes a metering valve spool which is movable to control a volume of fuel passing through the metering valve;
 the metering valve has an extension chamber and a retraction chamber on opposed sides of a land on the metering valve spool, and the extension chamber and the retraction chamber communicating with a servo valve to communicate a high pressure fluid and a low pressure connection to one of the extension chamber and the retraction chamber to extend or retract the metering valve spool;
 a forward valve spool face on a forward side of the metering valve spool, and a pump line connects the metering valve to the pump through a metering valve housing, the pump line extends into a metering valve inlet chamber providing a force against the forward face of the metering valve spool;

a seal is in said metering valve housing such that the forward face of the metering valve spool may seal against the seal in the metering valve housing to block flow from the metering valve inlet chamber;

a fuel line extends through the metering valve housing from the metering valve inlet chamber to a pressure regulating valve, the pressure regulating valve is downstream of the metering valve and has a pressure regulative spool having opposed faces with one of the opposed faces seeing a pressure from the fuel line downstream of the metering valve, and an opposed valve face of the pressure regulating spool seeing a pressure from the metering valve inlet chamber from a tap, and a line downstream of the pressure regulating valve to be connected to a combustor; and a controller programmed for controlling a position of the metering valve spool, wherein the controller selectively controls the servo valve to move the metering valve spool to control a volume of fuel delivered from the chamber to the pressure regulating valve, and further being programmed to move the metering valve spool to a position where the forward face of the valve spool seals on the seal in the metering valve housing to block pump flow reaching the pressure regulating valve, and also reaching the tap.

2. A fuel supply system as set forth in claim 1, wherein the controller controlling the servo valve to selectively connect one of the high pressure fluid and the low pressure connection to one of the extension chamber and the retraction chamber.

3. The fuel supply system as set forth in claim 2, wherein a first spring biases the metering valve spool towards the seal, and the first spring is opposed by a fluid in the retraction chamber.

4. The fuel supply system as set forth in claim 3, wherein a second spring biases the pressure regulating valve in a direction opposed to a pressure force provided by the tap.

5. The fuel supply system as set forth in claim 4, wherein a transducer provides a metering valve position to the control.

6. The fuel supply system as set forth in claim 5, wherein a piston head on the metering valve spool has a first diameter, and the land has a second diameter, the second diameter being larger than the first diameter.

7. The fuel supply system as set forth in claim 6, wherein the piston head received within a housing portion that extends to a forward end where the forward face of the metering valve spool is guided in the housing portion to seat on the seal.

8. The fuel supply system as set forth in claim 1, wherein a piston head on the metering valve spool has a first diameter, and the land has a second diameter, the second diameter being larger than the first diameter.

9. The fuel supply system as set forth in claim 8, wherein the piston head received within a housing portion that extends to a forward end where the forward valve spool face is guided in the housing portion to seat on the seal.

10. The fuel supply system as set forth in claim 1, wherein a housing portion receive an o-ring to seat on an outer peripheral surface of said piston head.

11. A gas turbine engine comprising:

a fuel tank and a fuel supply system including a fuel pump, the fuel system selectively providing fuel to a combustor in the gas turbine engine, the fuel supply system further including:

a metering valve connected to the fuel pump, the metering valve includes a metering valve spool which is movable to control a volume of fuel passing through the metering valve;

the metering valve has an extension chamber and a retraction chamber on opposed sides of a land on the metering valve spool, and the extension chamber and the retraction chamber communicating with a servo valve to communicate a high pressure fluid and a low pressure connection to one of the extension chamber and the retraction chamber to extend or retract the metering valve spool;

a forward valve spool face on a forward side of the metering valve spool, and a pump line connects the metering valve to the pump through a metering valve housing, the pump line extends into a metering valve inlet chamber providing a force against the forward valve spool face;

a seal is in said metering valve housing such that the forward face of the metering valve spool may seal against the seal in the metering valve housing to block flow into the metering valve inlet chamber;

a fuel line extends through the metering valve housing from the metering valve inlet chamber to a pressure regulating valve, the pressure regulating valve is downstream of the metering valve and has a pressure regulative spool having opposed faces with one of the opposed faces seeing a pressure from the fuel line downstream of the metering valve, and an opposed valve face of the pressure regulating spool seeing a pressure from the metering valve inlet chamber from a tap, and a line downstream of the pressure regulating valve to be connected to a combustor; and a controller is programmed for controlling a position of the metering valve spool, the controller selectively controls the servo valve to move the metering valve spool to control a volume of fuel delivered from the chamber to the pressure regulating valve, and further being programmed to move the metering valve spool to a position where the forward valve spool face seals on the seal in the metering valve housing to block pump flow reaching the pressure regulating valve, and also reaching the tap.

12. The gas turbine engine as set forth in claim 11, wherein the controller controlling the servo valve to selectively connect one of the high pressure fluid and low pressure connection to the one of the extension chamber and the retraction chamber.

13. The gas turbine engine as set forth in claim 12, wherein a first spring biases the metering valve spool towards the seal, and the first spring being opposed by a fluid in the retraction chamber.

14. The gas turbine engine as set forth in claim 13, wherein a second spring biases the pressure regulating valve in a direction opposed to a pressure force provided by the tap.

15. The gas turbine engine as set forth in claim 14, wherein a transducer provides a metering valve position to the control.

16. The gas turbine engine as set forth in claim 15, wherein a piston head on the metering valve spool has a first diameter, and the land has a second diameter, the second diameter being larger than the first diameter.

17. The gas turbine engine as set forth in claim 16, wherein the piston head received within a housing portion that extends to a forward end where the forward valve spool face is guided in the housing portion to seat on the seal.

18. The gas turbine engine as set forth in claim 11, wherein a piston head on the metering valve spool has a first diameter, and the land has a second diameter, the second diameter being larger than the first diameter.

19. The gas turbine engine as set forth in claim 18, wherein the piston head received within a housing portion extending to a forward end where the forward valve spool face is guided in the housing portion to seat on the seal.

20. The gas turbine engine as set forth in claim 11, wherein a housing portion receive an o-ring to seat on an outer peripheral surface of said piston head.

* * * * *